(12) United States Patent
Zhang et al.

(10) Patent No.: US 12,401,441 B2
(45) Date of Patent: Aug. 26, 2025

(54) SERVICE PROCESSING METHOD AND APPARATUS IN OPTICAL TRANSPORT NETWORK, AND ELECTRONIC DEVICE

(71) Applicant: ZTE Corporation, Shenzhen (CN)

(72) Inventors: Yuanbin Zhang, Shenzhen (CN); Yan Yuan, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 299 days.

(21) Appl. No.: 17/912,594

(22) PCT Filed: Dec. 21, 2020

(86) PCT No.: PCT/CN2020/138122
§ 371 (c)(1),
(2) Date: Sep. 19, 2022

(87) PCT Pub. No.: WO2021/190000
PCT Pub. Date: Sep. 30, 2021

(65) Prior Publication Data
US 2023/0129829 A1    Apr. 27, 2023

(30) Foreign Application Priority Data
Mar. 27, 2020 (CN) .......................... 202010232105.5

(51) Int. Cl.
*H04Q 11/00* (2006.01)
*H04J 3/16* (2006.01)
(52) U.S. Cl.
CPC ........ *H04J 3/1652* (2013.01); *H04Q 11/0067* (2013.01); *H04Q 2011/0086* (2013.01)

(58) Field of Classification Search
CPC ............... H04J 3/1652; H04Q 11/0067; H04Q 2011/0086
See application file for complete search history.

(56) References Cited

U.S. PATENT DOCUMENTS 8,259,750 B2 * 9/2012 Jiang ...................... H04J 3/1658
370/535
8,446,922 B2 * 5/2013 Yin ....................... H04J 3/0647
370/520

(Continued)

FOREIGN PATENT DOCUMENTS

CN    101155016 A    4/2008
CN    101800912 A    8/2010

(Continued)

OTHER PUBLICATIONS

International Search Report for corresponding PCT/CN2020/138122 filed Dec. 21, 2020; Report dated Mar. 10, 2021.

(Continued)

*Primary Examiner* — Tanya T Motsinger
(74) *Attorney, Agent, or Firm* — CANTOR COLBURN LLP

(57) ABSTRACT

Provided is a service processing method in an optical transport network, including: mapping a client service into a service container; mapping the service container into an optical transport network frame, wherein a payload area of the optical transport network frame is composed of payload blocks, and the payload blocks are used for carrying the service container; and carrying indication information of the payload block in an overhead area of the optical transport network frame, where a service processing apparatus in an optical transport network and a computer-readable medium are also provided.

18 Claims, 8 Drawing Sheets

(56) References Cited

U.S. PATENT DOCUMENTS

| | | | |
|---|---|---|---|
| 9,337,960 B2* | 5/2016 | Zhong | H03M 7/30 |
| 12,284,468 B2* | 4/2025 | Wang | H04L 41/0896 |
| 2004/0062277 A1* | 4/2004 | Flavin | H04J 3/1611 |
| | | | 370/474 |
| 2005/0078684 A1* | 4/2005 | Wolf | H04J 3/1617 |
| | | | 370/542 |
| 2007/0104485 A1* | 5/2007 | Zhang | H04J 3/1664 |
| | | | 398/69 |
| 2008/0199183 A1* | 8/2008 | Liu | H04J 3/1617 |
| | | | 398/103 |
| 2008/0256421 A1* | 10/2008 | Gerstel | H03M 13/353 |
| | | | 714/776 |
| 2012/0134674 A1* | 5/2012 | Shin | H04J 3/0623 |
| | | | 398/58 |
| 2016/0315725 A1 | 10/2016 | Shin | |
| 2017/0195077 A1* | 7/2017 | Su | H04J 3/16 |
| 2021/0091870 A1* | 3/2021 | Zhang | H04J 3/1652 |
| 2023/0076208 A1* | 3/2023 | Zhang | H04Q 11/0062 |
| 2023/0110290 A1* | 4/2023 | Zhang | H04J 3/1652 |
| | | | 398/58 |
| 2023/0129829 A1* | 4/2023 | Zhang | H04Q 11/0067 |
| | | | 398/52 |
| 2023/0135776 A1* | 5/2023 | Zhang | H04J 3/1652 |
| | | | 398/98 |
| 2024/0297849 A1* | 9/2024 | Liu | H04J 3/1658 |

FOREIGN PATENT DOCUMENTS

| | | | | |
|---|---|---|---|---|
| CN | 109981209 A | | 7/2019 | |
| CN | 110557217 A | | 12/2019 | |
| CN | 112511920 A | * | 3/2021 | H04J 3/1652 |
| CN | 113542934 A | * | 10/2021 | |
| EP | 2296297 A1 | | 3/2011 | |
| EP | 2747318 A1 | | 6/2014 | |
| JP | 2002057738 A | | 2/2002 | |

OTHER PUBLICATIONS

European Search Report for corresponding application EP20926656; Report dated Aug. 11, 2023.

Giorgio Cazzaniga SM Optics Italy , G. Sup-sub1G, "Sub 1 Gbit/s services transport over OTN", Oct. 15, 2019, pp. 1-16, XP044275986.

Maarten Visser Huawei Technolgies Co et, Any rate ODUflex text modifications, Feb. 1, 2020, pp. 1-13.

Wei Su Huawei Technologies Co et al, "Sub1G OTN enhancement consideration", vol. 11/15, Jun. 17, 2019, pp. 1-4 XP044270089.

Japanese Office Action for Application No. 2022-558576; dated Oct. 22, 2024.

European Office Action for Application No. 20926656.8, dated Mar. 27, 2025, 11 pages.

Maarten Vissers, Huawei Technolgies Co et al.: "Considerations on a Generic Tributary Procedure (GPT)", vol. 11/15, Jun. 18, 2019, pp. 1-13.

* cited by examiner

Fig. 1
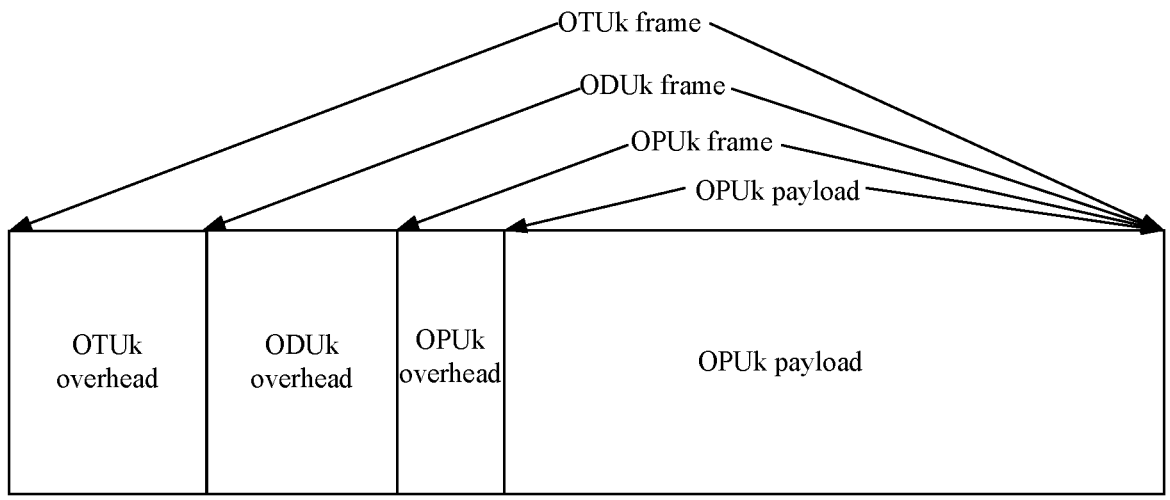
Fig. 2
Fig. 3
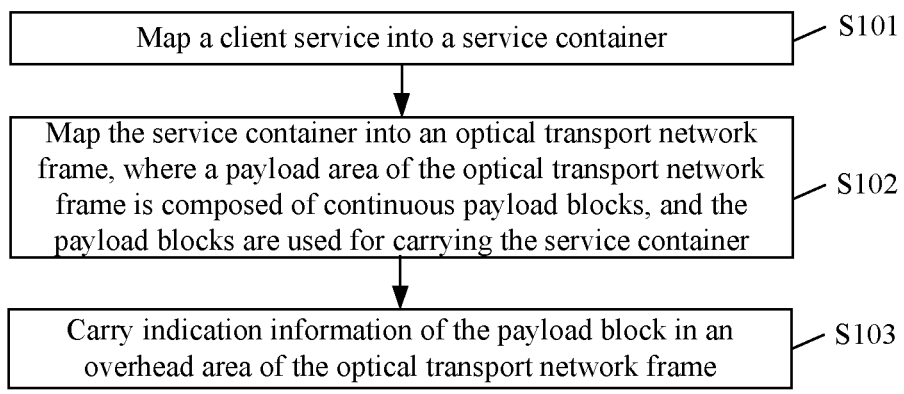

SERVICE PROCESSING METHOD AND APPARATUS IN OPTICAL TRANSPORT NETWORK, AND ELECTRONIC DEVICE

CROSS REFERENCE

This application is a National Stage Filing of the PCT International Application No. PCT/CN2020/138122 filed on Dec. 21, 2020, which claims priority to Chinese Application No. 202010232105.5 filed on Mar. 27, 2020, the entirety of which is herein incorporated by reference.

TECHNICAL FIELD

Embodiments of the present disclosure relate to the technical field of optical communications, and in particular, to a service processing method and apparatus in an optical transport network, and a computer-readable medium.

BACKGROUND

In the definition of an Optical Transport Network (OTN) in the related art, a method for loading a plurality of service signals into a payload of an optical transport network signal is as follows: first, an area of the optical transport network signal is divided into n time slots, wherein the time slots are implemented in a byte interleaving manner; and then, the service signals are loaded into one or more time slots in the payload of the optical transport network signal.

According to an optical transport network standard G.709 in the related art, the minimum time slot granularity of the OTN technology in the related art is 1.25 Gbps. When carrying services with a bandwidth lower than 1.25 Gbps, such as Fast Ethernet (FE) services, Synchronous Transfer Module-1 (STM-1) services, E1 services and other small-bandwidth services, there is a serious waste of bandwidth of the optical transport network. For example, the bandwidth of an E1 signal is 2.048 Mbps, if the E1 signal is loaded into a time slot with a bandwidth of 1.25 Gbps, the waste of bandwidth is as high as 99%. In view of the problem, a transmission technology is required to implement a method for efficiently carrying small-bandwidth services in the OTN.

SUMMARY

Embodiments of the present disclosure provide a service processing method and apparatus in an optical transport network, and a computer-readable medium.

In a first aspect, the embodiments of the present disclosure provide a service processing method in an optical transport network, including:
  mapping a client service into a service container;
  mapping the service container into an optical transport network frame, wherein a payload area of the optical transport network frame is composed of payload blocks, and the payload blocks are used for carrying the service container; and
  carrying indication information of the payload block in an overhead area of the optical transport network frame.

In a second aspect, the embodiments of the present disclosure provide a service processing method in an optical transport network, including:
  mapping a client service into a service container;
  mapping the service container into an optical transport network frame, wherein a payload area of the optical transport network frame is composed of payload blocks, the payload blocks are used for carrying the service container, every N continuous payload blocks form a payload block group, and the N continuous payload blocks located in the same payload block group carry the same service container; and
  carrying indication information of the payload block group in an overhead area of the optical transport network frame.

In a third aspect, the embodiments of the present disclosure also provide a service processing apparatus in an optical transport network, including:
  a first mapping module, configured to map a client service into a service container;
  a second mapping module, configured to map the service container into an optical transport network frame, wherein a payload area of the optical transport network frame is composed of payload blocks, and the payload blocks are used for carrying the service container; and
  a carrying module, configured to carry indication information of the payload block in an overhead area of the optical transport network frame.

In a fourth aspect, the embodiments of the present disclosure also provide a service processing apparatus in an optical transport network, including:
  a first mapping module, configured to map a client service into a service container;
  a second mapping module, configured to map the service container into an optical transport network frame, wherein a payload area of the optical transport network frame is composed of payload blocks, the payload blocks are used for carrying the service container, every N continuous payload blocks form a payload block group, and the N continuous payload blocks located in the same payload block group carry the same service container; and
  a carrying module, configured to carry indication information of the payload block group in an overhead area of the optical transport network frame.

In a fifth aspect, the embodiments of the present disclosure also provide an electronic device, including:
  one or more processors; and
  a memory having one or more programs stored thereon, wherein when the one or more programs are executed by the one or more processors, the one or more processors implement the methods provided in the first aspect and the second aspect.

In a sixth aspect, the embodiments of the present disclosure also provide a computer-readable medium, having a computer program stored thereon, wherein when executed by a processor, the program implements the methods provided in the first aspect and the second aspect.

BRIEF DESCRIPTION OF THE DRAWINGS

FIG. 1 is a schematic diagram of the structure of an optical channel frame involved in some embodiments of the present disclosure;

FIG. 2 is a schematic diagram in which a payload area in the structure of the optical channel frame is divided into 4 time slots according to an optical transport standard in the related art;

FIG. 3 is a flowchart of a service processing method in an optical transport network provided in some embodiments of the present disclosure;

DETAILED DESCRIPTION

Figure 4:
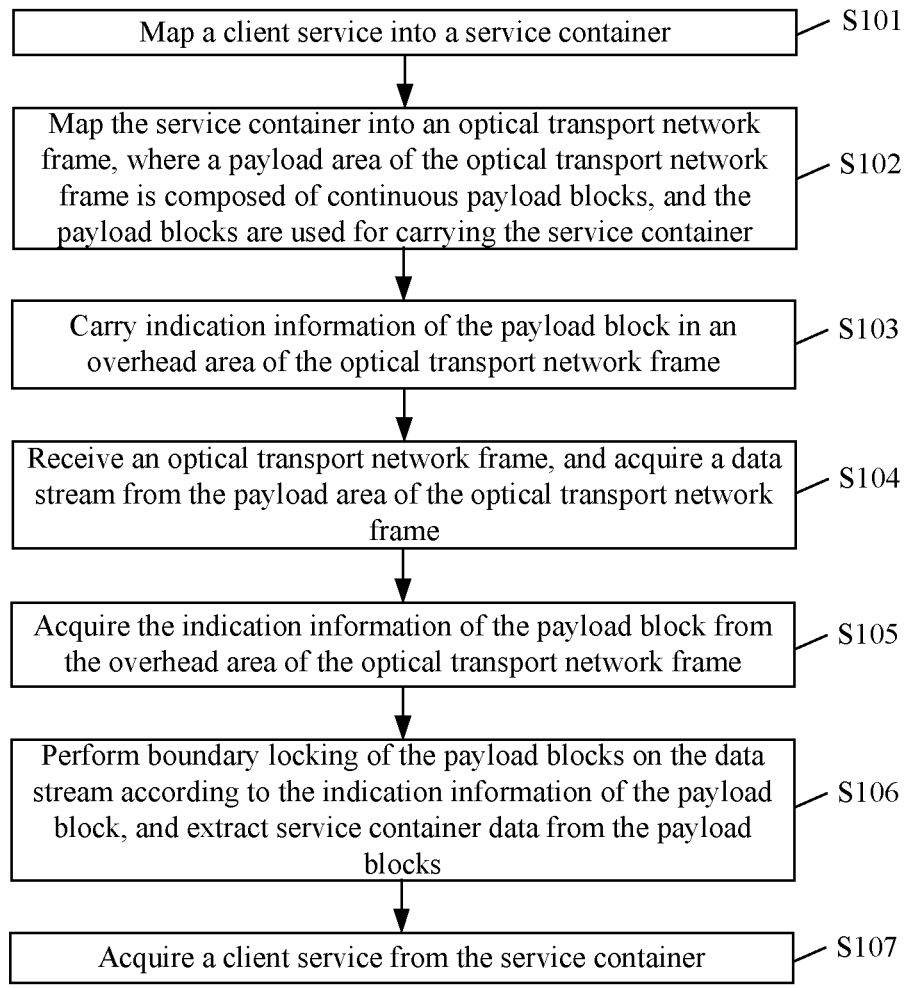
FIG. 4 is a flowchart of a service processing method in an optical transport network provided in some embodiments of the present disclosure.

In order that those having ordinary skill in the art may better understand the technical solutions of the present invention, a service processing method and apparatus in an optical transport network, an electronic device and a computer-readable medium provided by the present invention will be described in detail below in combination with the drawings.

Example embodiments will be described more sufficiently hereinafter with reference to the drawings, but the example embodiments may be embodied in different forms and should not be construed as limited to the embodiments set forth herein. Rather, these embodiments are provided so that the present disclosure will be thorough and complete, and those having ordinary skill in the art can fully understand the scope of the present disclosure.

Various embodiments of the present disclosure and various features of the embodiments may be combined with each other in the case of no conflict.

As used herein, the term "and/or" includes any and all combinations of one or more of relevant listed items.

The terms used herein are only used for describing exemplary embodiments and are not intended to limit the present disclosure. As used herein, singular forms "a" and "the" are intended to include plural forms as well, unless the context clearly dictates otherwise. It will also be understood that, when used herein, the terms "include" and/or "made of" specify the presence of features, entireties, steps, operations, elements and/or components, but do not preclude the presence or addition of one or more other features, entireties, steps, operations, elements, components, and/or groups thereof.

Unless otherwise defined, all terms (including technical and scientific terms) used herein have the same meanings as commonly understood by those having ordinary skill in the art. It will also be understood that those terms such as those defined in common dictionaries should be construed as having meanings consistent with those in related arts and the background of the present disclosure, and will not be construed as having idealized or over-formal meanings, unless expressly so limited herein.

FIG. 1 is a schematic diagram of the structure of an optical channel frame involved in some embodiments of the present disclosure. As shown in FIG. 1, in the embodiments of the present disclosure, it is taken as an example for description that an optical transport network signal is an Optical channel Transport Unit (OTU) signal. The OTU signal is composed of an OTUk frame, which includes an overhead area and a payload area. The overhead area includes: an overhead of the optical channel transport unit (denoted as an "OTUk overhead", and k may be 1, 2, 3, 4), an overhead of an Optical channel Data Unit (ODU) (denoted as an "ODUk overhead", and k may be 0, 1, 2, 2e, 3, 4), and an overhead of an Optical channel Payload Unit (OPU) (denoted as an "OPUk overhead", and k may be 0, 1, 2, 2e, 3, 4). The remaining part of the OTUk frame with the OTUk overhead removed is called an ODUk frame, the remaining part of the ODUk frame with the ODUk overhead removed is called an OPUk frame, and the remaining part of the OPUk frame with the OPUk overhead removed is called an OPUk payload (that is, the payload area in the structure of the optical channel frame). The payload area may be used for carrying service signals.

FIG. 2 is a schematic diagram in which the payload area in the structure of the optical channel frame is divided into 4 time slots according to an optical transport standard in the related art. As shown in FIG. 2, in the definition of the optical transport network in the related art, a method for loading a plurality of service signals into a payload of an optical transport network signal is as follows: first, the payload of the optical transport network signal is divided into n time slots, and then the service signals are loaded into one or more time slots in the payload of the optical transport network signal. Herein, the time slots are implemented in a byte interleaving manner. An exemplary description will be given below by taking dividing the payload area of OTUk into 4 time slots as an example. The OTUk frame is composed of byte blocks in 4 rows and 3824 columns, an area corresponding to column numbers from 1 to 16 is an overhead area (not shown), and an area corresponding to column numbers from 17 to 3824 is a payload area. Each small box in FIG. 2 represents one byte, and the OPUk payload area of an OPUk frame is composed of 4*3808 bytes, which are arranged in 4 rows and 3808 columns as shown in FIG. 2. FIG. 2 shows a case where an OPUk payload is divided into 4 time slots in the byte interleaving manner, that is, in a total of 3808 columns, starting from column 17, 4 adjacent bytes constitute a group, the 4 bytes in each group are respectively divided into 4 different time slots TS1, TS2, TS3, TS4, that is, 4 continuous bytes starting from column 17 respectively represent 4 time slots, so that all 4*3808 bytes in the OPUk payload are divided into 4 time slots, which are named as TS1, TS2, TS3, TS4 respectively, and m time slots may hold one ODU service (m is less than the maximum number n of time slots in the OPUk payload, and n is equal to 4 in FIG. 2).

According to the optical transport network standard G.709 in the related art, the minimum ODUk in the optical transport network is ODU0 with a rate of 1.25 G, therefore theoretically, the OPUk payloads in the OTUk frames of all rates should be divided into time slots based on the granularity of 1.25 G, so that the ODU0 can be loaded most efficiently. In this case, for some services with small bandwidths, such as FE services, STM-1 services and E1 services, directly carrying these services by the time slots will lead to serious waste of bandwidth.

In order to at least solve the above technical problems, the present disclosure proposes corresponding solutions, which will be exemplarily described below with reference to the drawings.

FIG. 3 is a flowchart of a service processing method in an optical transport network provided in some embodiments of the present disclosure. As shown in FIG. 3, the method includes operations S101 to S103.

At S101, a client service is mapped into a service container.

In the embodiments of the present disclosure, the client service specifically refers to a service (which is also generally referred to as a Sub1G service) with a small bandwidth compared with the bandwidth of an optical transport network frame. Optionally, the ratio of the bandwidth of the client service to the bandwidth of a payload area of the optical transport network frame is less than a preset ratio, and a specific value of the preset ratio may be set by professionals in the art. Generally speaking, the value of the preset ratio is less than or equal to 10%. In the embodiments of the present disclosure, it is only necessary to ensure that the bandwidth of the client service is less than the bandwidth of the payload area of the optical transport network frame.

In the embodiments of the present disclosure, the service container includes an ODU frame or an Optical Service Unit (OSU) frame. The process of mapping the client service into the service container belongs to a conventional technology in the art, and thus will not be repeated here.

At S102, the service container is mapped into an optical transport network frame, wherein a payload area of the optical transport network frame is composed of continuous payload blocks, and the payload blocks are used for carrying the service container.

At S103, indication information of the payload block is carried in an overhead area of the optical transport network frame.

The payload block (PB) refers to a certain number (greater than 1) of continuous bits occupied in the payload area, and the payload block is used for carrying the client service. When PB is divided for the OTN frame, since there may be a PB crossing two adjacent OTN frames, it is necessary to carry the indication information of the payload block in the overhead area of the OTN frame, and the indication information of the payload block is used for representing a correspondence between the payload area of the OTN frame and a PB boundary. On the basis of the indication information of the payload block, boundary locking (also called delineation) can be performed for the PBs in the payload area of the OTN frame, that is, a starting position of each PB in the payload area of the OTN frame can be determined.

In some embodiments, the indication information of the PB includes: a serial number of a column where the first byte of the first complete PB in the payload area of the OTN frame is located in the payload area of the OTN frame. Exemplarily, in the payload area of a certain OTN frame, the first byte of the first complete PB is located at the jth byte in the payload area, then the indication information of the PB is j, and j is an integer. Assuming that a pre-designed PB length is L, L≥j≥1, then in the payload area of the OTN frame, the bytes occupied by the first complete PB are from the jth byte to the (j+L−1)th byte in the payload area, the bytes occupied by the second complete PB are from the (j+L)th byte to the (j+2L−1)th byte, and so on.

In some other embodiments, the indication information of the PB includes: position information, in the corresponding PB, of the first byte in the payload area of the OTN frame. Exemplarily, the first byte in the payload area of the OTN frame is the kth byte in a certain PB, then the indication information of the PB is k, and k is an integer. Assuming that the pre-designed PB length is L, and L≥k≥1; if k=1, then in the payload area of the OTN frame, the bytes occupied by the first complete PB are the first byte to the (L−1)th byte in the payload area, the bytes occupied by the second complete PB are the Lth byte to the (2L−1)th byte in the payload area, and so on; and if k≠1, then in the payload area of the OTN frame, the bytes occupied by the first complete PB are the (L−k+2)th byte to the (2L−k+1)th byte in the payload area, and so on.

In some embodiments, in the payload area of the optical transport network frame, every P continuous PBs serve as a transport period, and before the operation S102 is performed, the method may further include: a value of P and an actual bandwidth of each PB are determined according to a payload bandwidth of the optical transport network frame and a desired bandwidth that is pre-configured for each PB, wherein the value of P satisfies: a quotient of the payload bandwidth divided by P is greater than or equal to the desired bandwidth, and a quotient of the payload bandwidth divided by (P+1) is less than the desired bandwidth; and the actual bandwidth of each PB is equal to a quotient of the payload bandwidth divided by P.

In this case, the operation S102 includes: the number of PBs that the service container needs to occupy is calculated according to the bandwidth of the service container and the bandwidth of one PB; distribution positions, in the transport period of the OTN frame, of the PBs that the service container needs to occupy are determined according to the number of PBs that the service container needs to occupy and on the basis of a preset allocation algorithm; and service container data is carried in the PBs at the determined distribution positions. The preset allocation algorithm includes a sigma-delta algorithm, the specific operation process of the sigma-delta algorithm belongs to a conventional technology in the art, and thus will not be repeated here.

In the technical solutions of the embodiments of the present disclosure, by means of carrying the small-bandwidth service in the service container, and carrying the small-bandwidth service by using the payload blocks in the payload area, the problem of waste of bandwidth can be effectively avoided.

FIG. 4 is a flowchart of a service processing method in an optical transport network provided in some embodiments of the present disclosure. As shown in FIG. 4, the method not only includes the operations S101 to S103 in the above embodiment, but also includes operations S104 to S107, and only the operations S104 to S107 will be described in detail below.

At S104, an optical transport network frame is received, and a data stream is acquired from the payload area of the optical transport network frame.

At S105, the indication information of the payload block is acquired from the overhead area of the optical transport network frame.

At S106, boundary locking of the payload blocks is performed in the data stream according to the indication information of the payload block, and service container data is extracted from the payload blocks.

At S107, a client service is acquired from the service container.

By means of the indication information of the payload block located in the overhead area, it is possible to implement delineation for the PBs in the payload area of the OTN frame. With regard to a specific delineation process, reference may be made to corresponding content in the foregoing embodiments, and thus will not be repeated here. After the delineation is completed, the service container data can be extracted from the PBs, so as to obtain the service container.

It should be noted that, the operations S101 to S103 are performed at a data sending end, and the operations S104 to S107 are performed at a data receiving end. In practical applications, an optical transport network device may serve as both the data sending end and the data receiving end.

In practical applications, different PB lengths are required in different scenarios. For example, devices of different manufacturers have different requirements for packet lengths, and the shortest delay can be realized when the size of the PB is the same as the packet length. In addition, in a scenario in which cross-processing is not required to be performed for the OSU, a PB as small as possible is selected to shorten the delay.

In order to solve the above technical problems, the embodiments of the present disclosure also provide a service processing method in an optical transport network. In the method, a service container is carried by a payload block group, and the length of the payload block group is adjustable, so as to adapt to different application scenarios.

Figure 5:
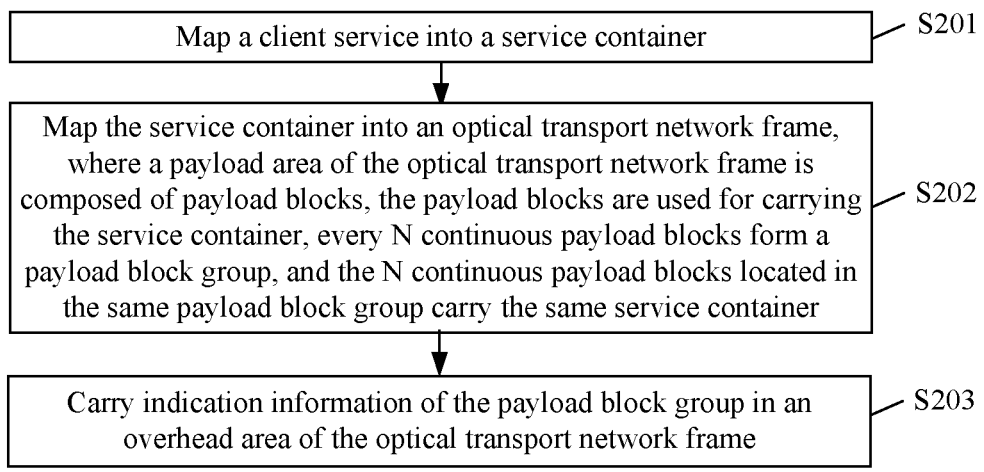
FIG. 5 is a flowchart of a service processing method in an optical transport network provided in some embodiments of the present disclosure.

FIG. 5 is a flowchart of a service processing method in an optical transport network provided in some embodiments of the present disclosure. As shown in FIG. 5, the service processing method in the optical transport network includes operations S201 to S203.

At S201, a client service is mapped into a service container.

At S202, the service container is mapped into an optical transport network frame, wherein a payload area of the optical transport network frame is composed of payload blocks, the payload blocks are used for carrying the service container, every N continuous payload blocks form a payload block group, and the N continuous payload blocks located in the same payload block group carry the same service container.

Herein, N is a positive integer.

At S203, indication information of the payload block group is carried in an overhead area of the optical transport network frame.

In the embodiments of the present disclosure, a value of N may be configured according to the needs of different application scenarios, so that the length of the payload block group meets actual needs.

In some embodiments, the indication information of the payload block group includes: a value of N, a payload block delineation indication, and a payload block group delineation indication.

The PB delineation indication is used for representing a correspondence between the payload area of the OTN frame and a PB boundary. On the basis of the PB delineation indication, boundary locking (also called PB delineation) can be performed for the PBs in the payload area of the OTN frame, that is, a starting position of each PB in the payload area of the OTN frame can be determined. The PB group delineation indication is used for representing a correspondence between the payload area of the OTN frame and a PB group boundary. On the basis of the PB group delineation indication, boundary locking (also called PB group delineation) can be performed for the PB groups in the payload area of the OTN frame, that is, a starting position of each PB group in the payload area of the OTN frame can be determined.

In some embodiments, the PB delineation indication includes: a serial number of a column where the first byte of the first complete PB in the payload area of the OTN frame is located in the payload area of the OTN frame, or position information, in the corresponding PB, of the first byte in the payload area of the OTN frame. With regard to specific descriptions, reference may be made to the corresponding content in the foregoing embodiments, and thus will not be repeated here.

In some embodiments, the PB group delineation indication includes: position information, in the located PB group, of the first complete PB in the payload area of the OTN frame. Exemplarily, if the first complete PB in the payload area of the OTN frame is the mth PB in a certain PB group, then the PB group delineation indication is m, wherein m is an integer, and $1 \leq m \leq N$. By means of the PB delineation indication and the PB group delineation indication, the byte position occupied by each PB group in the payload area of the OTN frame can be determined, that is, the boundary of the PB group can be determined.

In some embodiments, the service container is composed of byte blocks (BBs), and the number of bytes in one byte block is equal to the number of bytes in one PB. In a process of carrying the service container data in the determined PB group, N byte blocks of the service container data are carried in one PB group.

Figure 6:
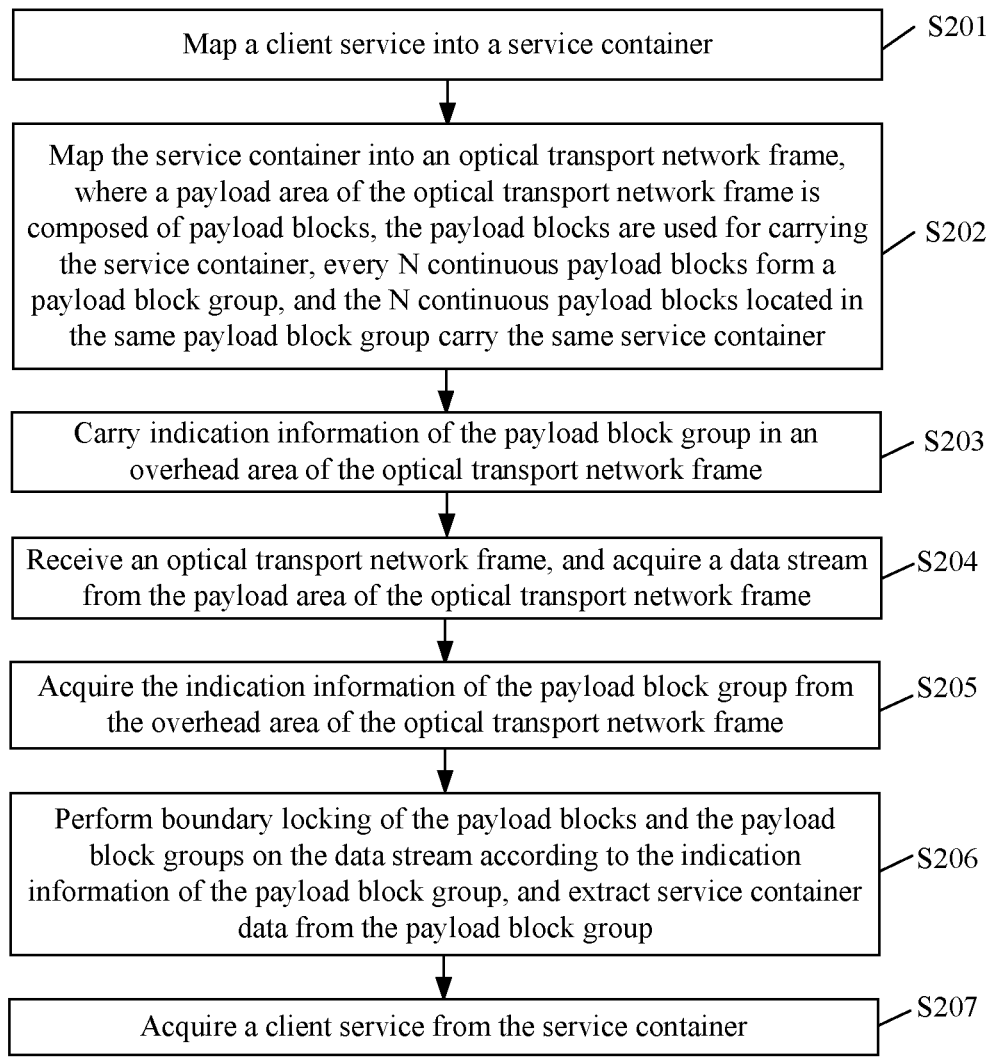
FIG. 6 is a flowchart of a service processing method provided in some embodiments of the present disclosure.

FIG. 6 is a flowchart of a service processing method provided in some embodiments of the present disclosure. As shown in FIG. 6, the method not only includes the operations S201 to S203 in the above embodiment, but also includes operations S204 to S207, and only the operations S204 to S207 will be described in detail below.

At S204, an optical transport network frame is received, and a data stream is acquired from the payload area of the optical transport network frame.

At S205, the indication information of the payload block group is acquired from the overhead area of the optical transport network frame.

At S206, boundary locking of the payload blocks and the payload block groups is performed in the data stream according to the indication information of the payload block group, and service container data is extracted from the payload block group.

At S207, a client service is acquired from the service container.

By means of the indication information of the PB group located in the overhead area, it is possible to implement delineation for the PBs and the PB groups in the payload area of the OTN frame. With regard to a specific delineation process, reference may be made to corresponding content in the foregoing embodiments, and thus will not be repeated here. After the delineation is completed, the service container data can be extracted from the PBs in the PB group, so as to obtain the service container.

It should be noted that, the operations S201 to S203 are performed at a data sending end, and the operations S204 to S207 are performed at a data receiving end. In practical applications, an optical transport network device may serve as both the data sending end and the data receiving end.

Figure 7:
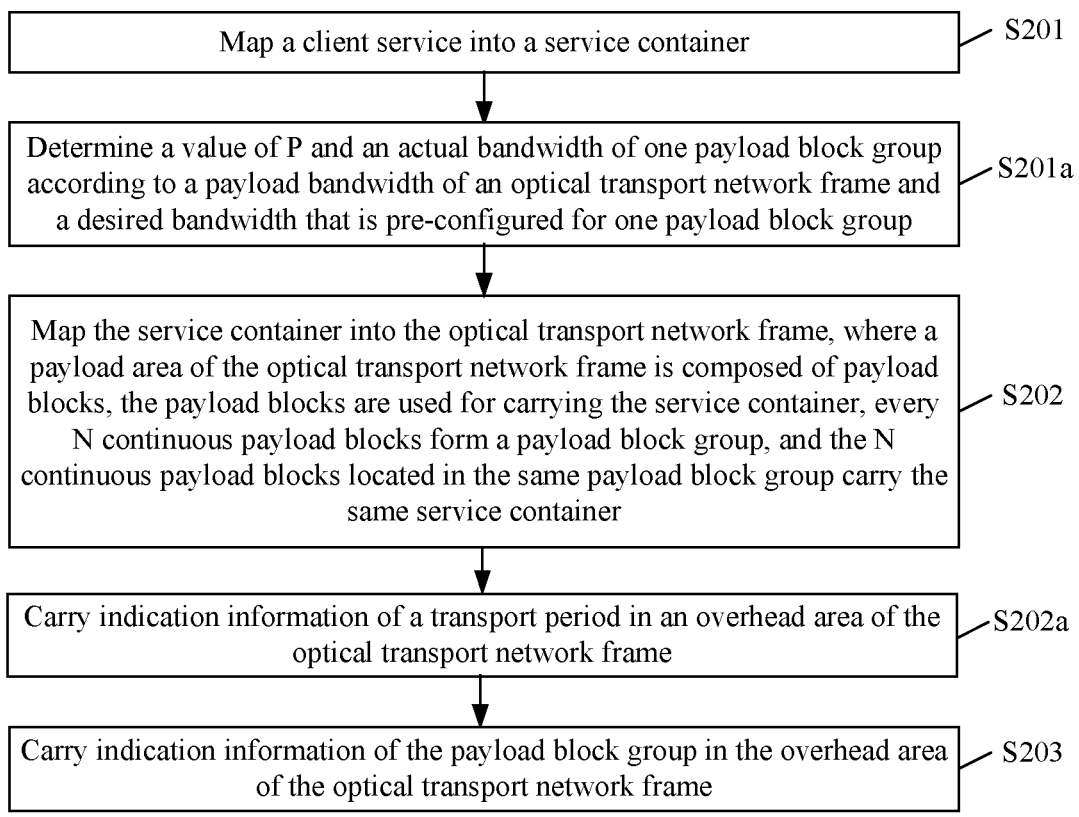
FIG. 7 is a flowchart of a service processing method in an optical transport network provided in some embodiments of the present disclosure.

FIG. 7 is a flowchart of a service processing method in an optical transport network provided in some embodiments of the present disclosure. As shown in FIG. 7, in the present embodiment, in the payload area of the OTN frame, every P continuous payload block groups serve as a transport period, the service processing method in the optical transport network not only includes the above operations S201 to S203, but also includes an operation S201a after the operation S201, and includes an operation S202a after the operation S2021k. Only the operations S201a and the S202a will be described in detail below.

At S201a, a value of P and an actual bandwidth of each payload block group are determined according to a payload bandwidth of the optical transport network frame and a desired bandwidth that is pre-configured for each payload block group.

The value of P satisfies: a quotient of the payload bandwidth divided by P is greater than or equal to the desired bandwidth, and a quotient of the payload bandwidth divided by (P+1) is less than the desired bandwidth; and the actual bandwidth of each payload block group is equal to a quotient of the payload bandwidth divided by P. The desired bandwidth of each PB group may be pre-configured according to actual needs.

At S202a, indication information of the transport period is carried in the overhead area of the optical transport network frame.

In the preset embodiment, in the payload area of the OTN frame, every P continuous PB groups serve as a transport period, the value of P is calculated according to the bandwidth B of the payload area of the OTN frame and the desired bandwidth R1 of a single PB group, and P satisfies the following two conditions at the same time:

condition 1: B/P>R1; and
condition 2: B/(P+1)<R1.

After P is calculated, the actual bandwidth of each PB group may be calculated as R2=B/P, and the length of the PB group may be adjusted by means of the configuration of the value of N.

In the present embodiment, one transport period includes P continuous PB groups, each PB group includes N PBs, the length of each PB is L, and the length of one transport period is P*N*L.

In order to facilitate the delineation of the transport period, the indication information of the transport period may be carried in the overhead area of the optical transport network frame. The indication information of the transport period is used for representing a correspondence between the payload area of the OTN frame and a transport period boundary. On the basis of the indication information of the transport period, boundary locking (also called transport period delineation) can be performed on the transport period in the payload area of the OTN frame.

In some embodiments, the indication information of the transport period includes: a serial number of a payload block group where the first complete payload block in the payload area of the optical transport network frame is located (that is, the group number, in the corresponding transport period, of the payload block group where the first complete payload block is located). Exemplarily, if the PB group where the first complete PB in the payload area of the OTN frame is located is the nth PB in a certain transport period, then the indication information of the transport period is n, n is an integer, and 1≤n≤P. By means of the indication information of the transport period and the indication information of the PB, the byte position occupied by each transport period in the payload area of the OTN frame can be determined, that is, the boundary of a transport period group can be determined. It should be noted that the "indication information of the transport period" provided in the embodiment of the present disclosure is only an optional implementation solution in the embodiments of the present disclosure. In some embodiments, it is possible to only set the indication information of the PB group in the overhead area of the OTN frame without setting the indication information of the transport period, but it may also be ensured that the service container data can be extracted subsequently.

Figure 8:
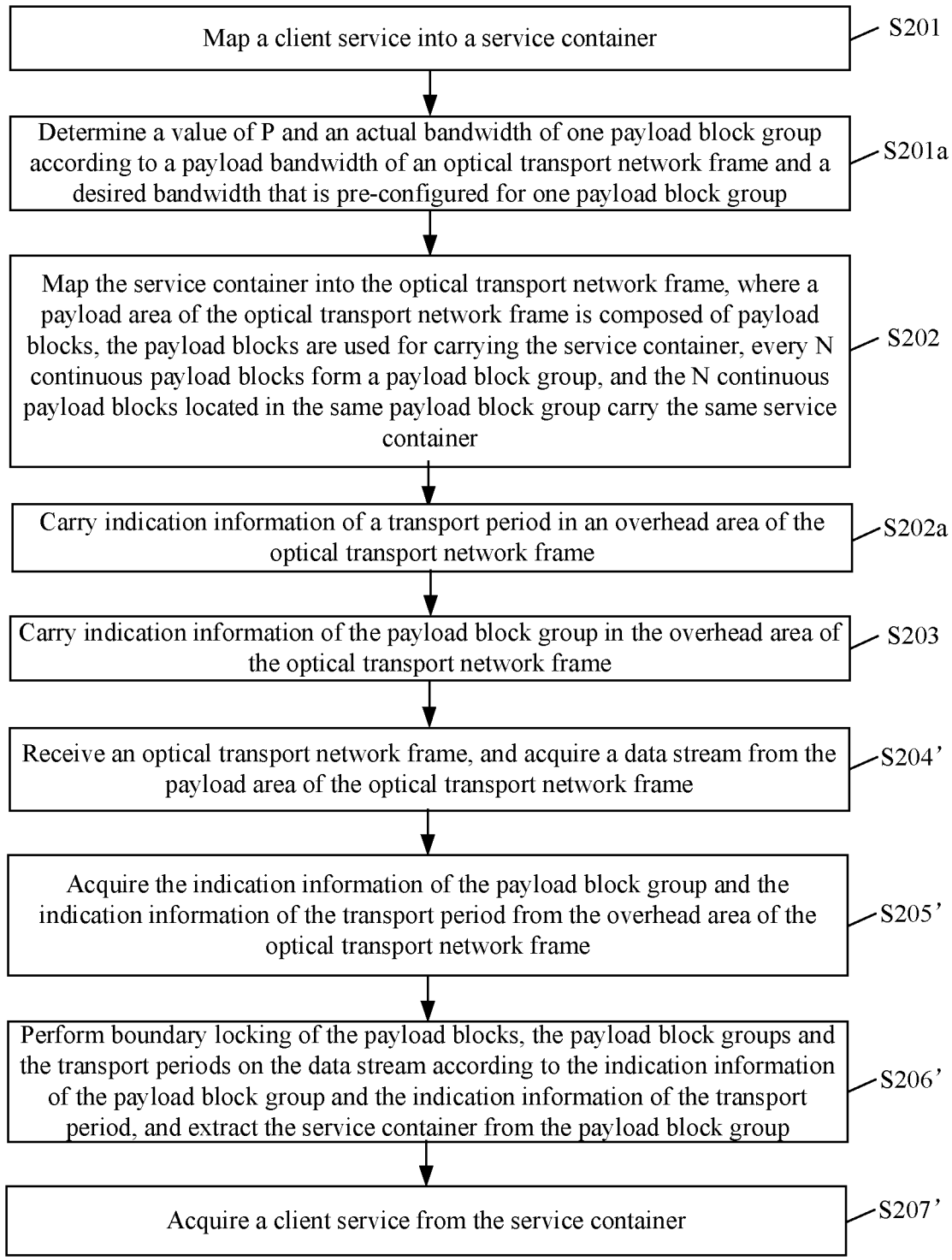
FIG. 8 is a flowchart of a service processing method in an optical transport network provided in some embodiments of the present disclosure.

FIG. 8 is a flowchart of a service processing method in an optical transport network provided in some embodiments of the present disclosure. As shown in FIG. 8, the method not only includes all operations in FIG. 7 above, but also includes operations S204' to S207', and only the operations S204' to S207' will be described in detail below.

At S204', an optical transport network frame is received, and a data stream is acquired from the payload area of the optical transport network frame.

At S205', the indication information of the payload block group and the indication information of the transport period are acquired from the overhead area of the optical transport network frame.

At S206', boundary locking of the payload blocks, the payload block groups and the transport periods are performed in the data stream according to the indication information of the payload block group and the indication information of the transport period, and extracting the service container from the payload block group.

At S207', acquiring a client service from the service container.

In some embodiments, the operation S202 includes: the number of PB groups that the service container needs to occupy is calculated according to the bandwidth of the service container and an actual bandwidth of each PB group; distribution positions, in a transport period, of the PB groups that the service container needs to occupy is determined according to the number of PB groups that the service container needs to occupy and on the basis of a preset allocation algorithm; and then, the service container data is carried in the PB groups at the determined distribution positions. The preset allocation algorithm includes a sigma-delta algorithm, the specific operation process of the sigma-delta algorithm belongs to a conventional technology in the art, and thus will not be repeated here.

In the embodiments of the present disclosure, by means of the indication information of the payload block group located in the overhead area and the indication information of the transport period, it is possible to implement delineation for the PBs, the PB groups and the transport periods in the payload area of the OTN frame. With regard to a specific delineation process, reference may be made to corresponding content in the foregoing embodiments, and thus will not be repeated here. After the delineation is completed, the service container data can be extracted from the PBs in the PB group, so as to obtain the service container.

It should be noted that, the operations S201 to S203 are performed at a data sending end, and the operations S204' to S207' are performed at a data receiving end. In practical applications, an optical transport network device may serve as both the data sending end and the data receiving end.

A detailed description will be given below in combination with specific examples.

Figure 9:
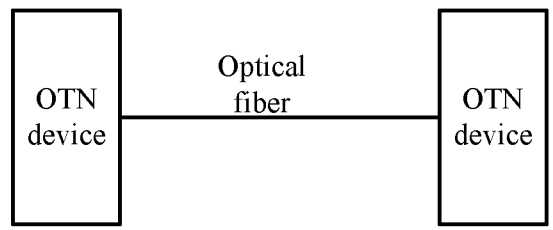
FIG. 9 is a schematic diagram of a transmission scenario in Example 1 of the present disclosure.
Figure 10:
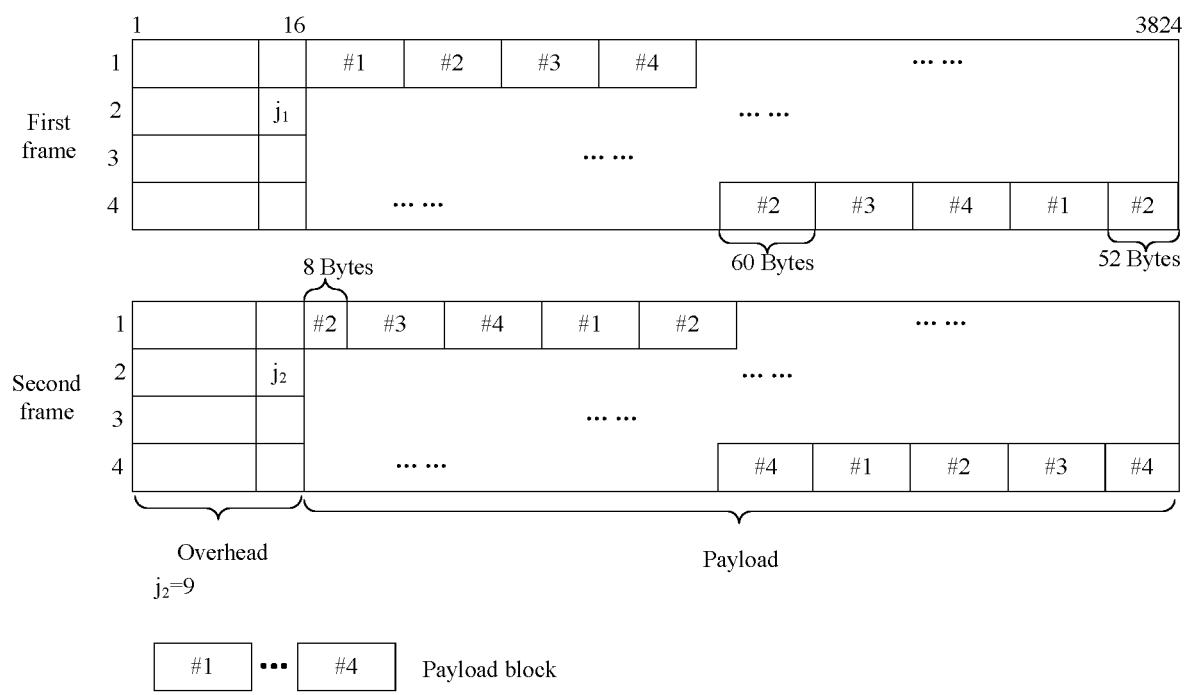
FIG. 10 is a schematic diagram of two adjacent optical transport network frames in the embodiment of the present disclosure.

FIG. 9 is a schematic diagram of a transmission scenario in Example 1 of the present disclosure, and FIG. 10 is a schematic diagram of two adjacent optical transport network frames in the embodiment of the present disclosure. As shown in FIG. 9 and FIG. 10, it is assumed that the payload area is divided into payload blocks at a length of 60 bytes. Two OTN devices transmit an OSU client signal with a bandwidth of 60 Mbps by means of an OTU1, which is represented by OSU #1, and there is no crossover device between the two OTN devices, so there is no need to divide the PBs into PB groups, and separate PBs are directly used to carry data services, which may be processed corresponding to the service processing methods shown in FIG. 3 and FIG. 4, and the specific process is as follows.

1) The payload bandwidth of the OTU1 is 2488320 Kbps, the value of the desired bandwidth of each PB is 10 Mbps, it may be obtained by calculation that when P=248, the ratio of the payload bandwidth of the OTU1 to P is approximately equal to 10.03 Mbps, which is the closest to the desired bandwidth, and thus the actual bandwidth of each PB is 10.03 Mbps.

2) At a sending end, starting from the first ODU1 frame, the payload area of one ODU1 frame contains 4*3808=15232 bytes, so there will be one 60-byte PB spanning two adjacent ODU1 frames, wherein the first ODU1 frame contains the first 52 bytes of this PB, and the second ODU1 frame contains the last 8 bytes of this PB. It is taken as an example that the indication information of the PB includes a serial number of a column where the first byte of the first complete PB in the payload area of the OTN frame is located in the payload area of the OTN frame, therefore the indication information of the PB corresponding to the second ODU1 frame is j=9.

3) j=9 is carried as the indication information in the overhead area of the second ODU1 frame.

4) The bandwidth of one OSU is 60 Mbps, the bandwidth of one PB is 10.03 Mbps, 6 PBs are required to carry the OSU, the distribution positions of the 6 PBs in the 248 PBs corresponding to one transport period are calculated according to the sigma-delta algorithm, and the OSU is carried in the 6 PBs at the determined distribution positions.

5) At a receiving end, the OTU1 frame is received, the PB data stream is extracted from the payload area of the OTU1 frame, PB delineation is performed according to the indication information j carried in the overhead area of the ODU1 frame, the data of the OSU is extracted from the PBs, and the client service is acquired from the OSU.

Figure 11:
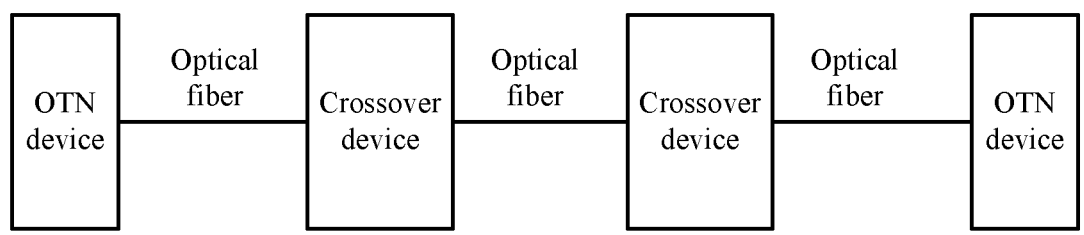
FIG. 11 is a schematic diagram of a transmission scenario in Example 2 of the disclosure.
Figure 12:
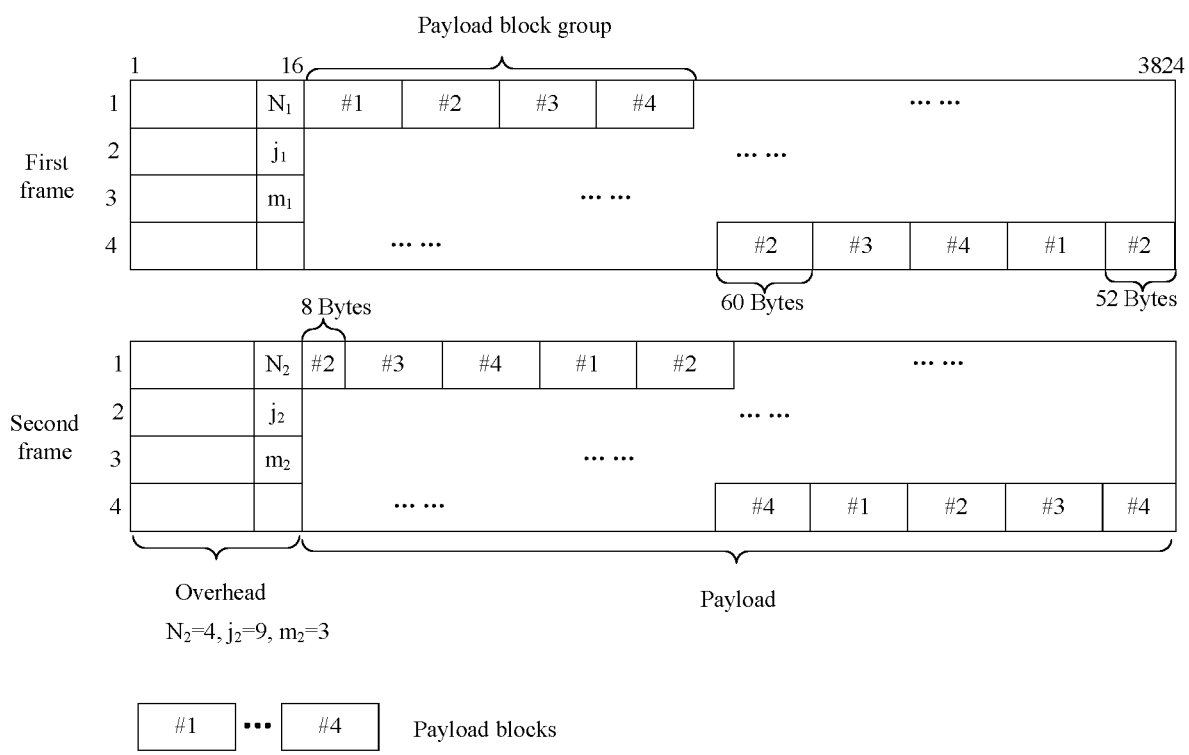
FIG. 12 is a schematic diagram of two adjacent optical transport network frames in the embodiment of the present disclosure.

FIG. 11 is a schematic diagram of a transmission scenario in Example 2 of the disclosure, and FIG. 12 is a schematic diagram of two adjacent optical transport network frames in the embodiment of the present disclosure. As shown in FIG. 11 and FIG. 12, it is assumed that the payload area is divided into payload blocks at a length of 60 bytes. Two OTN devices transmit an OSU client signal with a bandwidth of 40 Mbps by means of an OTU1, which is represented by OSU #1; and there are two crossover devices between the two OTN devices, so PB groups may be used to carry data services, which may be processed corresponding to the service processing methods shown in FIG. 5 to FIG. 8. The specific process is as follows.

1) The payload bandwidth of the OTU1 is 2488320 Kbps, the value of the desired bandwidth of each PB group is 10 Mbps, it may be obtained by calculation that when P=248, the ratio of the payload bandwidth of the OTU1 to P is approximately equal to 10.03 Mbps, which is the closest to the desired bandwidth, and thus the actual bandwidth of each PB group is 10.03 Mbps.

2) Since 2 crossover settings are required, 4 continuous PBs may form a PB group for carrying data, that is, the value of N is 4. In this case, every 248×4×60=59520 bytes serve as a transport period.

3) At a sending end, starting from the first ODU1 frame, the payload area of one ODU1 frame contains 4*3808=15232 bytes, so there will be one 60-byte PB spanning two adjacent ODU1 frames, wherein the first ODU1 frame contains the first 52 bytes of this PB, the second ODU1 frame contains the last 8 bytes of this PB, and this PB is the second PB in one PB group. It is taken as an example that the PB delineation indication includes a serial number of a column where the first byte of the first complete PB in the payload area of the OTN frame is located in the payload area of the OTN frame, and the PB group delineation indication includes position information, in the located PB group, of the first complete PB in the payload area of the optical transport network frame, then the PB delineation indication corresponding to the second ODU1 frame is j=9, and the PB delineation indication corresponding to the second ODU1 frame is m=3.

4) N=4, j=9 and m=3 are carried as the indication information of the PB group in the overhead area of the second ODU1 frame.

5) The bandwidth of one OSU is 40 Mbps, the bandwidth of one PB group is 10.03 Mbps, 4 PB groups are required to carry the OSU, the distribution positions of the 4 PB groups in the 248 PB groups corresponding to one transport period are calculated according to the sigma-delta algorithm, and the OSU is carried in the 4 PB groups at the determined distribution positions.

6) At a receiving end, the OTU1 frame is received, the PB data stream is extracted from the payload area of the OTU1 frame, PB delineation and PB group delineation are performed according to the indication information of the PB group, i.e., N=4, j=9 and m=3, carried in the overhead area of the ODU1 frame, the data of the OSU is extracted from the PB groups, and the client service is acquired from the OSU.

Figure 13:
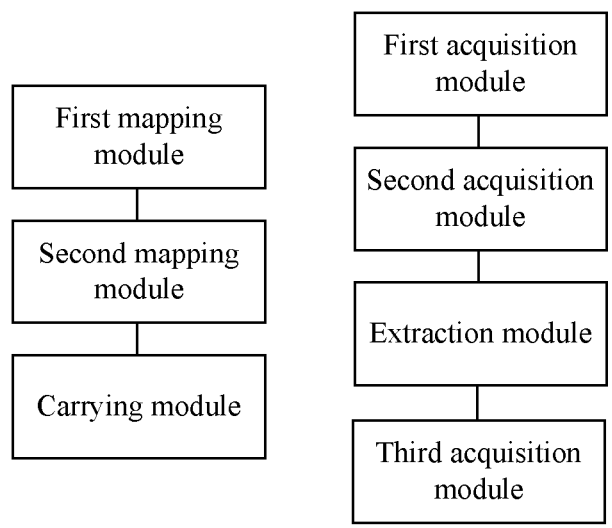
FIG. 13 is a structural block diagram of a service processing apparatus in an optical transport network provided in some embodiments of the present disclosure.

FIG. 13 is a structural block diagram of a service processing apparatus in an optical transport network provided in some embodiments of the present disclosure. As shown in FIG. 13, the service processing apparatus may be used for implementing the service processing method provided in the foregoing embodiments, and the service processing apparatus includes a first mapping module, a second mapping module and a carrying module. In some embodiments, the service processing apparatus may further include a first acquisition module, a second acquisition module, an extraction module and a third acquisition module.

In some embodiments, the service processing apparatus may be used for implementing the service processing method provided in FIG. 3 and FIG. 4, in this case, the first mapping module is configured to map a client service into a service container. The second mapping module is configured to map the service container into an optical transport network frame, wherein a payload area of the optical transport network frame is composed of payload blocks, and the payload blocks are used for carrying the service container; and the carrying module is configured to carry indication information of the payload block in an overhead area of the optical transport network frame.

In this case, the first acquisition module is configured to receive an optical transport network frame, and acquire a data stream from the payload area of the optical transport network frame; the second acquisition module is configured to acquire the indication information of the payload block from the overhead area of the optical transport network frame; the extraction module is configured to perform boundary locking of the payload blocks in the data stream according to the indication information of the payload block, and extract service container data from the payload blocks; and the third acquisition module is configured to acquire a client service from the service container.

In some embodiments, the service processing apparatus may be used for implementing the service processing method provided in FIG. 5 to FIG. 8, in this case, the first mapping module is configured to map a client service into a service container; the second mapping module is configured to map the service container into an optical transport network frame, wherein a payload area of the optical transport network frame is composed of payload blocks, the payload blocks are used for carrying the service container, every N continuous payload blocks form a payload block group, and the N continuous payload blocks located in the same payload block group carry the same service container; and the carrying module is configured to carry indication information of the payload block group in an overhead area of the optical transport network frame.

In this case, the first acquisition module is configured to receive an optical transport network frame, and acquire a data stream from the payload area of the optical transport network frame; the second acquisition module is configured to acquire the indication information of the payload block group from the overhead area of the optical transport network frame; the extraction module is configured to perform boundary locking of the payload blocks and the payload block groups in the data stream according to the indication information of the payload block group, and extract service container data from the payload block group; and the third acquisition module is configured to acquire a client service from the service container.

For specific descriptions of the above modules, reference may be made to corresponding content in the foregoing embodiments, and thus will not be repeated here.

Figure 14:
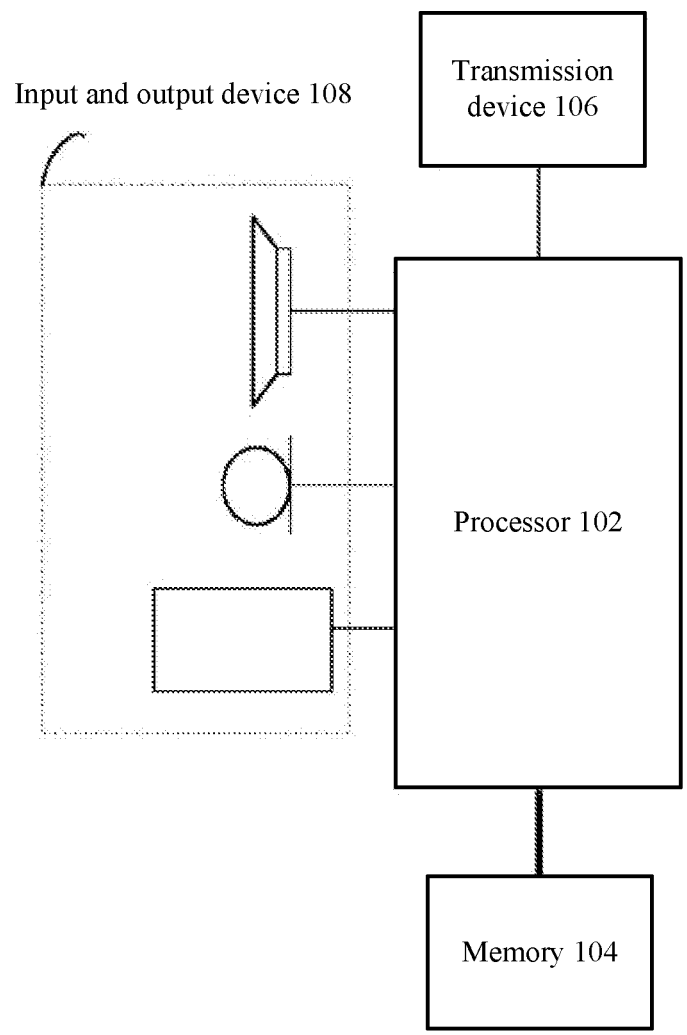
FIG. 14 is a structural block diagram of an electronic device provided in some embodiments of the present disclosure.

FIG. 14 is a structural block diagram of an electronic device provided in some embodiments of the present disclosure. As shown in FIG. 14, the electronic device 10 may be a mobile terminal, a computer terminal, or a similar computing apparatus. The electronic device 10 includes one or more processors 102 (only one is illustrated in the drawing, the processor 102 may include, but is not limited to, a processing apparatus such as a micro-programmed control unit (MCU) or a field programmable gate array (FPGA)) and a memory 104, wherein one or more programs are stored on the memory 104, and when the one or more programs are executed by the one or more processors 102, the one or more processors implement the operations in the processing methods provided in the foregoing embodiments.

In some embodiments, the above mobile terminal may further include a transmission device 106 for a communication function, and an input and output device 108. Those having ordinary skill in the art may understand that the structure shown in FIG. 14 is only for illustration, and does not limit the structure of the above mobile terminal. For example, the mobile terminal 10 may further include more or less components than those shown in FIG. 14, or have a different configuration than that shown in FIG. 14.

The memory 104 may be used for storing computer programs, for example, software programs and modules of application software, such as computer programs corresponding to the service processing method in the optical transport network in the embodiments of the present disclosure. By means of running the computer programs stored in the memory 104, the processor 102 executes various functional applications and data processing, that is, implements the above method. The memory 104 may include a high-speed random access memory, and may also include a nonvolatile memory, such as one or more magnetic disk storage apparatuses, flash memories, or other nonvolatile solid-state memories. In some instances, the memory 104 may further include memories that are arranged remotely relative to the processor 102, and these memories may be connected to a mobile terminal 10 by a network. Instances of the above network include, but are not limited to, the Internet, an intranet, a local area network, a mobile communication network, and combinations thereof.

The transmission device 106 is used for receiving or sending data by means of a network. A specific instance of the above network may include a wireless network provided by a communication provider of the mobile terminal 10. In one instance, the transmission device 106 includes a Network Interface Controller (NIC), which may be connected to other network devices by means of a base station, so as to communicate with the Internet. In one instance, the transmission device 106 may be a Radio Frequency (RF) module, which is used for communicating with the Internet in a wireless manner.

The embodiments of the present disclosure also provide a computer-readable medium, having a computer program stored thereon, wherein when executed by a processor, the program implements the operations in the processing method provided in the foregoing embodiments.

By means of the technical solutions provided in the embodiments of the present disclosure, it is possible to solve the problem of serious waste of bandwidth caused by transmitting an optical transport service by dividing the payload area into time slots in the prior art, and achieve an effect of improving the bandwidth utilization rate of the optical transport network.

Those having ordinary skill in the art may understand that all or some operations in the methods disclosed above, and functional modules/units in the systems and apparatuses may be implemented as software, firmware, hardware, and appropriate combinations thereof. In a hardware embodiment, the division between the functional modules/units mentioned in the above descriptions does not necessarily correspond to the division of physical components; for example, one physical component may have a plurality of functions, or one function or operation may be executed cooperatively by several physical components. Some or all physical components may be implemented as software that is executed by a processor, such as a central processing unit, a digital signal processor or a microprocessor, or implemented as hardware, or implemented as an integrated circuit, such as an application-specific integrated circuit. Such software may be distributed on a computer-readable medium, which may include a computer storage medium (or a non-transitory medium) and a communication medium (or a transitory medium). As is well known to those having ordinary skill in the art, the term computer storage medium includes volatile and nonvolatile, and removable and non-removable media, which are implemented in any method or technology for storing information (such as computer-readable instructions, data structures, program modules or other data). The computer storage medium includes, but is not limited to, RAMs, ROMs, EEPROMs, flash memories or other memory technologies, CD-ROMs, digital versatile disks (DVDs) or other optical disk memories, magnetic cartridges, magnetic tapes, magnetic disk memories or other magnetic storage apparatuses, or any other media that may be used for storing desired information and that may be accessed by a computer. In addition, it is well known to those having ordinary skill in the art that, the communication medium typically contains computer-readable instructions, data structures, program modules, or other data in a modulated data signal such as a carrier wave or other transport mechanisms, and may include any information transmission medium.

Exemplary embodiments have been disclosed herein. Moreover, although specific terms are employed, they are used and should only be construed in a general descriptive sense and not for restrictive purposes. In some instances, it is apparent to those having ordinary skill in the art that, unless expressly stated otherwise, features, characteristics and/or elements that are described in combination with an exemplary embodiment may be used alone or in combination with other features, characteristics and/or elements in other embodiments. Accordingly, it will be understood by those having ordinary skill in the art that, various changes in forms and details may be made without departing from the scope of the present disclosure as set forth in the appended claims.

What is claimed is:

1. A service processing method in an optical transport network, comprising:
   mapping a client service into a service container;
   mapping the service container into an optical transport network frame, wherein a payload area of the optical transport network frame is composed of payload blocks, a certain number of continuous bits form a payload block, and the payload blocks are used for carrying the service container; and
   carrying indication information of the payload block in an overhead area of the optical transport network frame; wherein the indication information of the payload block comprises: a serial number of a column where the first byte of the first complete payload block in the payload area of the optical transport network frame is located in the payload area of the optical transport network frame; or, position information, in the corresponding payload block, of the first byte in the payload area of the optical transport network frame;
   wherein in the payload area of the optical transport network frame, every P continuous payload blocks serve as a transport period; and the method further comprises: determining a value of P and an actual bandwidth of each payload block according to a payload bandwidth of the optical transport network frame and a desired bandwidth that is pre-configured for each payload block.

2. The method according to claim 1,
   wherein the value of P satisfies: a quotient of the payload bandwidth divided by P is greater than or equal to the desired bandwidth, and a quotient of the payload bandwidth divided by (P+1) is less than the desired bandwidth; and the actual bandwidth of each payload block is equal to a quotient of the payload bandwidth divided by P.

3. The method according to claim 1, further comprising:
   receiving an optical transport network frame, and acquiring a data stream from the payload area of the optical transport network frame;
   acquiring the indication information of the payload block from the overhead area of the optical transport network frame;
   performing boundary locking of the payload blocks in the data stream according to the indication information of the payload block, and extracting service container data from the payload blocks; and
   acquiring a client service from the service container.

4. A service processing method in an optical transport network, comprising:
   mapping a client service into a service container;
   mapping the service container into an optical transport network frame, wherein a payload area of the optical transport network frame is composed of payload blocks, the payload blocks are used for carrying the service container, every N continuous payload blocks form a payload block group, and the N continuous payload blocks located in the same payload block group carry the same service container; and
   carrying indication information of the payload block group in an overhead area of the optical transport network frame; wherein the indication information of the payload block group comprises: a value of N, a payload block delineation indication, and a payload block group delineation indication.

5. The method according to claim 4, wherein the payload block delineation indication comprises: a serial number of a column where the first byte of the first complete payload block in the payload area of the optical transport network frame is located in the payload area; or, position information, in the corresponding payload block, of the first byte in the payload area of the optical transport network frame.

6. The method according to claim 4, wherein the payload block group delineation indication comprises: position information, in the located payload block group, of the first complete payload block in the payload area of the optical transport network frame.

7. The method according to claim 4, wherein in the payload area of the optical transport network frame, every P continuous payload blocks serve as a transport period; and the method further comprises:
   determining a value of P and an actual bandwidth of each payload block group according to a payload bandwidth of the optical transport network frame and a desired bandwidth that is pre-configured for each payload block group,
   wherein the value of P satisfies: a quotient of the payload bandwidth divided by P is greater than or equal to the desired bandwidth, and a quotient of the payload bandwidth divided by (P+1) is less than the desired bandwidth; and the actual bandwidth of each payload block group is equal to a quotient of the payload bandwidth divided by P.

8. The method according to claim 7, further comprising: carrying indication information of the transport period in the overhead area of the optical transport network frame.

9. The method according to claim 8, wherein the indication information of the transport period comprises a serial number of a payload block group where the first complete payload block in the payload area of the optical transport network frame is located.

10. The method according to claim 4, wherein the service container is composed of byte blocks, and the number of bytes in one byte block is equal to the number of bytes in one payload block; and
    in a process of carrying service container data in a determined payload block group, N byte blocks of the service container data are carried in one payload block group.

11. The method according to claim 4, further comprising:
    receiving an optical transport network frame, and acquiring a data stream from the payload area of the optical transport network frame;
    acquiring the indication information of the payload block group from the overhead area of the optical transport network frame;
    performing boundary locking of the payload blocks and the payload block groups in the data stream according to the indication information of the payload block group, and extracting service container data from the payload block group; and acquiring a client service from the service container.

12. The method according to claim 8, further comprising:

receiving an optical transport network frame, and acquiring a data stream from the payload area of the optical transport network frame;

acquiring the indication information of the payload block group and the indication information of the transport period from the overhead area of the optical transport network frame;

performing boundary locking of the payload blocks, the payload block groups and the transport periods in the data stream according to the indication information of the payload block group and the indication information of the transport period, and extracting the service container from the payload block group; and acquiring a client service from the service container.

13. A service processing apparatus in an optical transport network, comprising a memory storing instructions and a processor in communication with the memory, wherein the processor is configured to execute the instructions to perform the method of claim 1.

14. A service processing apparatus in an optical transport network, comprising a memory storing instructions and a processor in communication with the memory, wherein the processor is configured to execute the instructions to perform the method of claim 4.

15. A non-transitory computer-readable medium, having a computer program stored thereon, wherein when executed by a processor, the program implements the method according to claim 1.

16. The method according to claim 1, wherein the indication information of the payload block comprises: position information, in the corresponding payload block, of the first byte in the payload area of the optical transport network frame.

17. The method according to claim 4, wherein the payload block delineation indication comprises: position information, in the corresponding payload block, of the first byte in the payload area of the optical transport network frame.

18. A non-transitory computer-readable medium, having a computer program stored thereon, wherein when executed by a processor, the program implements the method according to claim 4.

* * * * *